(12) United States Patent
Paris et al.

(10) Patent No.: US 12,478,560 B2
(45) Date of Patent: Nov. 25, 2025

(54) CALCIUM COACERVATES FOR REMINERALIZATION AND FOR DEMINERALIZATION INHIBITION

(71) Applicant: Muhlbauer Technology GmbH, Hamburg (DE)

(72) Inventors: Sebastian Paris, Neuruppin (DE); Dominik Gruber, Constance (DE); Helmut Colfen, Constance (DE); Neziha Bulgun, Berlin (DE); Elisabeth Prause, Berlin (DE)

(73) Assignee: Muhlbauer Technology GmbH, Hamburg (DE)

( * ) Notice: Subject to any disclaimer, the term of this patent is extended or adjusted under 35 U.S.C. 154(b) by 697 days.

(21) Appl. No.: 17/602,160

(22) PCT Filed: Apr. 14, 2020

(86) PCT No.: PCT/EP2020/060466
§ 371 (c)(1),
(2) Date: Oct. 7, 2021

(87) PCT Pub. No.: WO2020/208261
PCT Pub. Date: Oct. 15, 2020

(65) Prior Publication Data
US 2022/0202657 A1    Jun. 30, 2022

(30) Foreign Application Priority Data
Apr. 10, 2019  (DE) .......................... 102019109524.7

(51) Int. Cl.
*A61K 6/84* (2020.01)
*A61K 6/889* (2020.01)

(52) U.S. Cl.
CPC ................ *A61K 6/84* (2020.01); *A61K 6/889* (2020.01)

(58) Field of Classification Search
CPC .................................. A61K 6/84; A61K 6/889
See application file for complete search history.

(56) References Cited

U.S. PATENT DOCUMENTS

| | | |
|---|---|---|
| 2010/0272764 A1 | 10/2010 | Latta et al. |
| 2019/0054012 A1 | 2/2019 | De Pablo et al. |
| 2022/0202655 A1 | 6/2022 | Gruber et al. |

FOREIGN PATENT DOCUMENTS

| | | |
|---|---|---|
| EP | 2476404 B1 | 7/2012 |

OTHER PUBLICATIONS

Ackermann et al., "Biomimetic transformation of polyphosphate microparticles during restoration of damaged teeth Maximilian" Dental Materials 2019, 35:244-256.

Adper Scotchbond SE Self Etch Adhesive, 3M, Oct. 2007, retrieved from the internet, https://multimedia.3m.com/mws/media/7547510/scotchbond-universal-adhesive-technical-product-profile.pdf.

Bungenberg De Jong et al., "Coacervation (Partial miscibility in colloid systems) (Preliminary Communication)" Proc. K. Ned. Akad. Wet. 1929, 32: 849-856.

Buskes et al., "Lesion formation and lesion remineralization in enamel under constant composition conditions. A new technique with applications" Caries Res. 1985, 19(6): 490-496.

Dorri et al., "Micro-invasive interventions for managing proximal dental decay in primary and permanent teeth (Review)" Cochrane Database Syst Rev. Nov. 5, 2015; (11):CD010431.

Gwinnett," Structure and composition of enamel" Oper. Dent. (1992) Suppl. 5: 10-17.

Huang et al., "A Carbonate Controlled-Addition Method for Amorphous Calcium Carbonate Spheres Stabilized by Poly(acrylic acid)s" Langmuir 2007, 23:12086-12095.

Hydroxyapatite, Wikipedia, Mar. 13, 2019, Retrieved from the internet: https://de.wikipedia.org/w/index.php?title=Hydroxylapatit&oldid=186535008.

International Search Report and Written Opinion mailed Aug. 14, 2020, Intl. Appl No. PCT/EP2020/060466, 10 pages.

Jiao et al., "Complementarity and Uncertainty in Intrafibrillar Mineralization of Collagen" Advanced Functional Materials, Oct. 11, 2016, 26(38): 6858-6875.

Kaempfe et al., "Micromolding of Calcium Carbonate Using a Bio-Inspired, Coacervation-Mediated Process" J. Am. Ceram. Soc. 2013, 96(3): 736-742.

Kim et al., "Functional biomimetic analogs help remineralize apatite-depleted demineralized resin-infiltrated dentin via a bottom-up approach" Acta Biomater. Jul. 2010; 6(7):2740-50.

Lauth et al., "Coacervate-directed synthesis of $CaCO_3$ microcarriers for pH-responsive delivery of biomolecules" J. Mater. Chem. B 2014, 2: 7725-7731.

Li et al. "A novel jet-based nano-hydroxyapatite patterning technique for osteoblast guidance" J. R. Soc. Interface 2010, 7:189-197.

Perry et al., "The Effect of Salt on the Complex Coacervation of Vinyl Polyelectrolytes" Polymers 2014, 6(6): 1756-1772.

Fact Sheet from the World Health Organization, "Sugars and dental caries" dated Nov. 9, 2017 (accessed at https://www.who.int/newsroom/fact-sheets/detail/sugars-and-dental-caries on Oct. 9, 2024) (4 pages).

Definition of "coacervation" from the International Union of Pure and Applied Chemistry (IUPAC) Compendium of Chemical Terminology (2014) (doi:10.1351/goldbook.C01116) (1 page).

Li et al. "Impact of $Bi_2O_3$ and $ZrO_2$ Radiopacifiers on the Early Hydration and C—S—H Gel Structure of White Portland Cement" J. Funct. Biomater. 2019, 10(4):46 (15 pages).

Goldberg et al. "Dentin: Structure, Composition and Mineralization" Front Biosci (Elite Ed). 2011, 3:711-735 (25 pages).

(Continued)

*Primary Examiner* — Shirley V Gembeh
(74) *Attorney, Agent, or Firm* — Casimir Jones, S.C.; Anne M. Reynolds

(57) ABSTRACT

The invention relates to calcium coacervate for use in a method for caries prevention and/or caries treatment, comprising a step during which dental enamel is infiltrated with calcium coacervate; and to kits that comprise: a) a phosphate ion-containing solution; and b1) a calcium coacervate-containing emulsion and/or b2) a second solution comprising polyanions and/or their salts, and a calcium ion-containing third solution.

9 Claims, 10 Drawing Sheets

(56) References Cited

OTHER PUBLICATIONS

Goldberg, "Enamel and Dentin Carious Lesions" JSM Dent. 2020, 8(1):1120 (8 pages).
Zhao et al. "Endothelial responses of magnesium and other alloying elements in magnesium-based stent materials" Metallomics 2015, 7(1):118-128 (11 pages).

CALCIUM COACERVATES FOR REMINERALIZATION AND FOR DEMINERALIZATION INHIBITION

BACKGROUND

The invention relates to calcium coacervates for use in a method for caries prevention and/or caries treatment and also to corresponding kits.

The widespread prevalence of a variety of preventative measures has put caries on the backfoot in the majority of industrialized countries. In 2005, then, the proportion of children in Germany with a caries-free dentition was already more than ⅔, compared to fewer than 50% in as late as 1997. A distinct reduction here was achieved in particular in the number of cavitated lesions, these being late stages in the caries process, requiring intense and invasive treatment. In spite of the drop in late caries stages, many early stages of the disease are still being observed. In these early stages, the dental enamel is porous because of an acid-induced loss of mineral, but still exhibits an apparently intact surface (pseudointact surface layer). These early stages of caries can be healed, specifically through remineralization by minerals dissolved in the saliva. Preconditions for this healing are a reduction in caries-promoting factors, such as a sugary diet, and promotion of factors which promote healing, such as good oral hygiene and the use of fluoride-containing oral hygiene products. If attempts to achieve a sustained change in the lifestyle and the oral hygiene of the patient are unsuccessful, however, the caries-promoting factors become predominant and the lesions continue to progress, loosing additional mineral matter and ultimately resulting in cavities, for which the only possible treatments are restorative.

Caries is a dynamic process which is marked by a loss of mineral matter (demineralization) by the hard substances of the tooth. Dental enamel is the hardest substance in the human body. Inorganic matter makes up 95-96% by weight of enamel. In addition, enamel contains 4% water and 1% organic matrix (Schroeder, 1992, *Orale Strukturbiologie*, Stuttgart: Thieme, Chapter 1; Gwinnett, 1992, *Structure and composition of enamel*, Oper Dent, Suppl. 5: 10-17). The inorganic fraction is made up of crystals which consist of calcium phosphate compounds, predominantly hydroxylapatite ($Ca_5[OH|(PO_4)_3]$). Underlying the demineralization during caries may be, for example, a disruption to the homeostasis of the oral microflora as a result of frequent consumption of fermentable carbohydrates, accompanied by promotion of the growth of acidogenic (acid-forming) and aciduric (acid-tolerant) bacteria, such as *Streptococcus mutans* and lactobacillae (Meyer-Lückel et al., 2012, *Karies. Wissenschaft and Klinische Praxis*. Stuttgart: Thieme, ZMK Praxis). The increased production of organic acids by these bacteria results in a demineralization wherein calcium ions and phosphate ions are leached from the hard substance of the tooth, causing it to become increasingly porous and fragile. Early carious lesions are therefore marked by increasing porosity of the dental enamel, with the surface remaining relatively intact. Only in later stages does the instability of the lesion, through progressive loss of mineral, increase to an extent such that the lesion suffers cavitation and forms a "carious hole".

The remineralization—i.e., reuptake of calcium and phosphate—of noncavitated carious lesions is a natural process, which can be promoted by various therapeutic agents, such as fluorides or calcium products. Problematic from a clinical standpoint, however, is the fact that the products in question must usually be applied by the patient regularly—in the form of toothpaste, for example—and that a one-off administration by the dentist is usually not enough. When such compounds are applied, moreover, a frequent problem is that the remineralization is only superficial and does not reach the depths of the carious lesion. Another problem is that the concentration of calcium and of phosphate in remineralizing solutions cannot be increased ad infinitum, since at high concentrations there is precipitation in the remineralization solution and the ions are no longer available for mineralization in the hard substances of the tooth.

Another method for arresting noncavitated carious lesions is that of infiltration with photocuring polymers (ICON, DMG Chemisch-Pharmazeutische Fabrik GmbH). As one of the few microinvasive methods, caries infiltration is acknowledged to have clinical efficacy as well (Dorri et al., *Micro-invasive interventions for managing proximal dental decay in primary and permanent teeth*. Cochrane Database of Systematic Reviews 2015, Issue 11; EP 2 476 404 B1). In caries infiltration, the microporosities of noncavitated carious lesions are infiltrated with a polymer-based filling. While this allows the lesion to be halted, in other words its progress hindered, it does not allow it to be healed, i.e., remineralized. For instance, the lesions treated in this way continue to be visible in an x-ray picture, for example. Consequently there is a need for substances and methods for caries treatment and caries prevention that enable remineralization of the dental enamel and possibly provide protection against demineralization.

DESCRIPTION

This object is achieved through the use of calcium coacervate in a method for caries prevention and/or caries treatment that comprises steps wherein dental enamel is infiltrated with calcium coacervate, preferably with a calcium coacervate emulsion.

The use of calcium coacervate in accordance with the invention allows the amount of calcium phosphate, more particularly the amount of hydroxylapatite, in the treated tooth to be increased, i.e., allows the tooth to be remineralized, i.e., to be healed. "Healing" is understood by the present invention to refer to partial or complete remineralization of the tooth, and ideally to establishment of the original condition of the tooth. For this purpose the calcium in the calcium coacervate used in the invention is able to mineralize with phosphate or phosphate ions to form calcium phosphate, preferably hydroxylapatite ($Ca_5[OH|(PO_4)_3]$).

The phosphate ions needed for this purpose, for the mineralization reaction, are provided preferably in that first a phosphate solution is infiltrated into the lesion and subsequently the dental enamel is dried. Through this first infiltration process, the phosphate—a species needed for the mineralization of calcium phosphate—is incorporated uniformly and at high concentration into the entire depth of the lesion. In a second infiltration process, calcium coacervate, preferably in the form of a calcium coacervate emulsion—and hence the second ionic species ($Ca^{2+}$) needed for the mineralization—is infiltrated. As a result, the phosphate salt incorporated during the first step is dissolved again, inducing in turn a mineralization of the calcium coacervates to form calcium phosphate, preferably hydroxylapatite. Through the two-stage application in preferred embodiments, and through the associated step of dissolution of the phosphate salt, it is possible to achieve mineralization in the entire depth of the lesion.

Coacervation, which was first described in 1929 (Bungenberg de Jong & Kruyt, 1929, *Coacervation (Partial miscibility in colloid systems)* (Preliminary Communication), Proc K Ned Akad Wet, 32: 849-856), describes the liquid-liquid phase separation of readily soluble colloids into two phases separate from one another. A distinction is made between simple and complex coacervation (Huang et al., 2007, *A Carbonate Controlled-Addition Method for Amorphous Calcium Carbonate Spheres Stabilized by Poly(acrylic acid)s*, Langmuir, 23, 24: 12086-12095). The complex coacervation used in the invention marks out the electrostatic attraction of oppositely charged colloids or polyelectrolytes with ions, molecules or other colloids and/or polyelectrolytes. This results in a liquid-liquid phase separation. A polymer- and calcium-rich, highly concentrated phase and an aqueous phase of low concentration are developed. The coacervates form as calcium-rich droplets (Kaempfe et al., 2013, *Micromolding of Calcium Carbonate Using a Bio-Inspired, Coacervation-Mediated Process*, The American Ceramic Society, 96: 736-742; Lauth et al., 2014, *Coacervate-directed synthesis of CaCO₃ microcarriers for pH-responsive delivery of biomolecules*, The Royal Society of Chemistry, 2: 7725-7731). This droplet formation is heavily dependent on the properties of the respective solution (pH, ion-binding strength) and on the electrostatic forces which occur when two oppositely charged species are brought together (Perry et al., 2014, *The Effect of Salt on the Complex Coacervation of Vinyl Polyelectrolytes*, Polymers, 6(6): 1756-1772). "Coacervation" in the sense of the present invention describes the crosslinking of negatively charged polyelectrolytes by calcium ions. Complex coacervation is employed in the food industry, in the production of gelatin (Kaempfe et al. 2013; see above), or in cosmetology, in order to isolate antioxidant oils (Lauth et al., 2014; see above). Suitable coacervation methods are therefore known to those skilled in the art.

The calcium coacervate of the invention is prepared by the method of complex coacervation. It may for example be preparable or prepared in a method which comprises steps wherein polyanions and/or their salts are mixed with a calcium salt. In this case both components are preferably in solution—that is, for example, each dissolved in an aqueous solution. Expressed alternatively, this preparation method for a calcium coacervate mixes a solution which comprises polyanions and/or their salts with a calcium ion-containing solution. The polyanions may be selected, for example, from the group consisting of polyacids, polysulfonates, polyphosphonates, polyphosphates, and others. The polyanions are polyanionic polymers. The polyanions are suitable for forming calcium coacervates with calcium ions. This means that the polyanions are capable of complexing calcium ions. The use of polyacids is particularly preferred. Examples of suitable polyacids are polyacrylic acid, polyaspartate, and the like, with particular preference being given to polyacrylic acid. For preparing the calcium coacervate, more particularly the calcium coacervate emulsion, it is preferred for a polyacrylic acid-containing solution to be mixed with a calcium-containing solution.

In the case of complex coacervation with polyanionic polymers, such as PAA-Na, with calcium ions ($Ca^{2+}$), the strong attraction between, for example, the carboxylate groups of the polyacrylic acid and the calcium ions leads to the development of, for example, (PAA-)$Ca^{2+}$ complexes in the form of droplets (Kaempfe et al. (2013, *Micromolding of Calcium Carbonate Using a Bio-Inspired, Coacervation-Mediated Process*. The American Ceramic Society; 96: 736-742; Huang et al., 2007, *A Carbonate Controlled-Addition Method for Amorphous Calcium Carbonate Spheres Stabilized by Poly(acrylic acid)s*. Langmuir, 23, 24: 12086-12095). In the invention, therefore, the calcium coacervate comprises polyanion-calcium complexes, preferably polyacid-calcium complexes, more preferably polyacrylic acid-calcium complexes.

The mixing of the solution which comprises polyanions and/or their salts with the calcium ion-containing solution forms a calcium coacervate-containing emulsion, in accordance with the principles outlined above. Portions of this emulsion begin to sediment relatively quickly, to form a second, waxlike, macroscopic coacervate phase. The infiltration of the calcium coacervate emulsions and of the further solutions into the dental enamel, in accordance with the invention, is accomplished through capillary forces, which allow the emulsions/solutions to penetrate rapidly and deeply into the dental enamel. "Infiltration" and "infiltrate" herein therefore mean that liquids are able to penetrate, by means of capillary forces, into the dental enamel. Conversely, the second, sedimented, waxlike coacervate phase is not suitable for infiltration into a microlesion in accordance with the invention. In the invention, therefore, the unsedimented emulsion phase is used for the infiltration (also referred to as the "droplet phase").

Suitable polyanion salts, e.g., polyacid salts, and calcium salts for preparing the solutions outlined above are known to those skilled in the art. Factors to be borne in mind when selecting the salts include, in particular, sufficient solubility in aqueous solutions, and biocompatibility/toxicity of the salts. The polyanion salt may be selected, for example, from the group consisting of polyanion sodium salt (e.g., polyacrylic acid sodium salt (PAA-Na)), polyanion potassium salt, polyanion ammonium salt, and the like. The calcium salt used in the invention may be selected, for example, from the group consisting of calcium chloride dihydrate, other hydrated forms of calcium chloride, calcium nitrate, calcium acetate, and other organic salts of calcium.

Within the invention it has surprisingly been found that particularly good remineralization results can be achieved if the calcium coacervate is prepared by mixing polyacrylic acid salt and calcium salt in a weight ratio of 50:20 to 50:45, preferably 50:33. In other words, the calcium coacervate is preparable preferably in a method which comprises the steps wherein polyacrylic acid-containing solution and calcium ion-containing solution are mixed in a molar ratio of 70.5:10 to 70.5:35, preferably about 70.5:22.5, based on the concentration of polyacid and of calcium ions respectively. The same proportions are also applicable to other polyanions, with the use of polyacrylic acid being particularly preferred.

The calcium coacervate is preferably present in an aqueous solution. This may equally comprise aqueous polyanion solutions and calcium salt solutions.

For the mineralization of calcium phosphates, preferably hydroxylapatite, the polyanion-$Ca^{2+}$ complexes are admixed with phosphate ions ($H_xPO_4^{(3-x)-}$, x=0, 1 or 2). The term "phosphate ions" as used herein embraces phosphate ions in different states of hydration—that is, for example, phosphate anions, hydrogenphosphate anions, and dihydrogenphosphate anions.

Calcium phosphates, in the form for example of hydroxylapatite, begin to precipitate just a short time after the reaction of the phosphate ion-containing solution with calcium coacervate. This makes it more difficult to infiltrate the calcium phosphate (e.g., hydroxylapatite) into greater depths of the dental enamel. In embodiments particularly preferred in the invention, therefore, the calcium phosphate is generated in the dental enamel itself. Within the invention it has been found that particularly successful prophylaxis and therapy are achieved if the calcium coacervate is used in a method which comprises steps wherein first (a) the dental enamel is infiltrated with phosphate ions; and (b) subsequently the dental enamel is infiltrated with calcium coacervate. Through the successive infiltration with phosphate ions and calcium coacervate it is possible to achieve remineralization even in relatively deep layers of a carious lesion.

A possible option prior to the infiltration with phosphate ions in step (a) in the method is to carry out a step wherein (a1) the pseudointact surface layer of the dental enamel is wholly or partly removed. The pseudointact surface layer generally has a thickness of 30 to 100 μm and results from the continual remineralization of the dental enamel in the oral cavity. The pseudointact surface layer therefore masks the deeper demineralized zone of a lesion. As a result of removal of the pseudointact surface layer, this demineralized zone becomes more readily accessible for the infiltrating solutions/emulsions.

The pseudointact surface layer may be removed by partial etching of the dental enamel, such as partial etching with an acid, for example, and/or by mechanical removal of the surface layer, by means of drilling or grinding, for example. Examples of suitable acids for partially etching the surface layer include phosphoric acid, sulfuric acid, and hydrochloric acid, with hydrochloric acid being particularly preferred. Suitable further acids and parameters for carrying out partial etching with an acid are known to those skilled in the art and are elucidated in more detail in EP 2 476 404 B1, for example.

Within the invention the infiltration with phosphate ions in step (a) takes place with an aqueous solution which comprises phosphate ions. For infiltrating the dental enamel with the phosphate ions, the aqueous solution is applied in excess to the tooth or to the lesion. The solution may be incubated on the lesion for example for 1 min or more, 2 min or more, 5 min or more, before the lesion is infiltrated in step (b) with calcium coacervate, preferably approximately for 1 min or more, 2 min or more, 5 min or more. In other words, the respective incubation time may be for example from 1 min to 90 min, preferably 1 to 70 min.

The molar concentration with which the phosphate ions are infiltrated into the lesion is preferably above the concentration of the calcium in the calcium coacervate emulsion. The concentration of the aqueous phosphate ion solution may be, for example, 0.1 M or more, 0.2 M or more, 0.3 M or more, 0.4 M or more, 0.5 M or more, 0.6 M or more, 0.7 M or more—for example, about 1 M.

The aqueous phosphate ion solution may contain phosphate ions in the form of dipotassium hydrogen phosphate, for example. Other potassium phosphates as well, and also sodium and ammonium phosphates, are suitable in the invention. The skilled person is capable of generating appropriate variants of these phosphate ion solutions. Factors requiring particular attention in this context are the water solubility and biocompatibility of the phosphate ions.

Before the calcium coacervate solution is applied to the dental enamel and is able to infiltrate it, the dental enamel may be dried in order to guarantee the effect of sufficiently strong capillary forces for the infiltration with calcium coacervate in the following step (b). Preferably, therefore, the method comprises a step (b1) wherein between the infiltration in step (a) and the infiltration in step (b) the dental enamel is dried. The drying of the dental enamel may take place through waiting, i.e., air-drying or evaporation. Alternatively or additionally, accelerated drying may be accomplished by using a stream of air, for example, to blow away remaining residues of liquid.

The infiltration of the dental enamel or the lesion with calcium coacervate takes place subsequently in a manner analogous to the infiltration with phosphate ion-containing solution. For the infiltration the calcium coacervate, preferably the calcium coacervate emulsion, is applied to the tooth for 1 min or more, 5 min or more, 10 min or more and incubated on said tooth. In other words, the incubation time may be, for example, from 1 min to 48 h, preferably 5 min to 36 h.

In a related aspect, the invention relates to a kit, preferably a kit for use in a method for caries prevention and/or caries treatment, characterized in that the kit comprises: a) a phosphate ion-containing first solution; and b1) a calcium coacervate-containing emulsion and/or b2) a second solution, which comprises polyanions and/or their salts, and a calcium ion-containing third solution. Because the calcium coacervates undergo sedimentation from a calcium coacervate-containing emulsion over time and, as elucidated elsewhere herein, form a waxlike phase which is no longer suitable for infiltration, particular preference is given to the combination of components a) and b2), as this combination permits longer storage of the kit.

The kit may optionally and additionally comprise (a1) an acid-containing solution, e.g., a hydrochloric acid-containing solution. This acid-containing solution is suitable for the partial etching of the dental enamel and consequently as described above for removing the pseudointact surface layer of the dental enamel.

In the invention it has been found that certain proportions of polyacrylic acid salt and potassium salt are able to form particularly advantageous calcium coacervate solutions. In a further aspect, therefore, the invention relates to a method for preparing a calcium coacervate, characterized in that the method comprises steps wherein polyacrylic acid sodium salt is mixed with calcium chloride dihydrate in a molar ratio of 70.5:10 to 70.5:35, preferably about 70.5:22.5, based on the concentration of polyacid and of calcium ions respectively. Expressed alternatively, polyacrylic acid sodium salt may be mixed with calcium chloride dihydrate in a weight ratio of 50:20 to 50:45, preferably 50:33.

In a related aspect, the invention also relates to the use of the calcium coacervate described herein for caries prevention and/or caries treatment, characterized in that dental enamel is infiltrated with the calcium coacervate.

Lastly the invention also relates to a therapeutic and/or prophylactic method for treating and/or preventing caries (or carious lesions), wherein the calcium coacervate described herein is applied to dental enamel, in the region of a carious lesion, for example. As described elsewhere, particular preference is given to the infiltration, prior to the application of the calcium coacervate, of a phosphate ion-containing solution into the dental enamel, e.g., into the lesion.

BRIEF DESCRIPTION OF FIGURES

Exemplary embodiments of the invention are represented schematically in the drawings, wherein.

Figure 2:
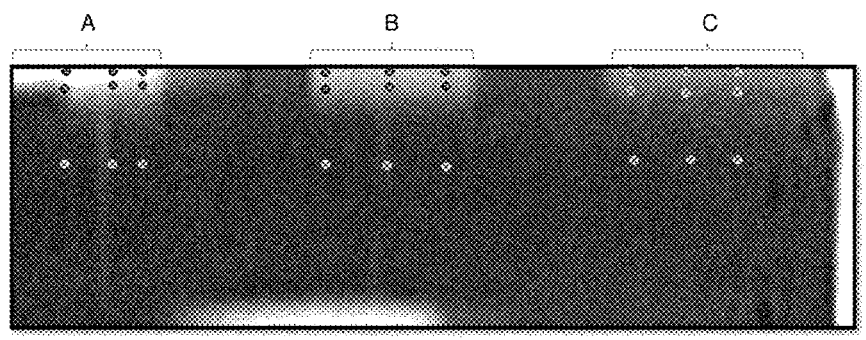
Figure 3:
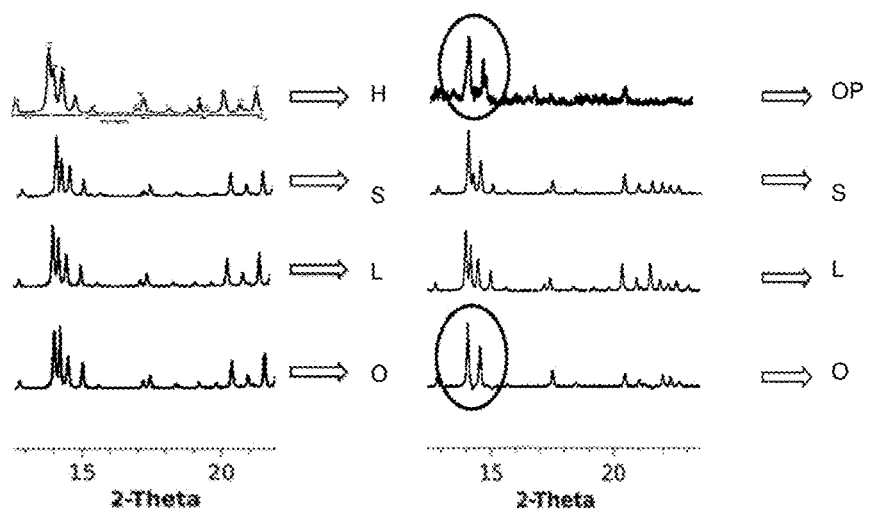
Figure 4A:
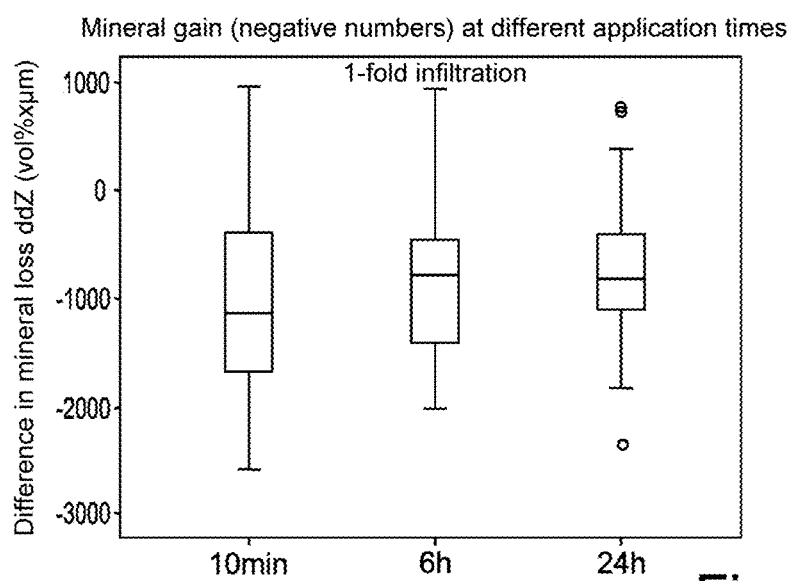
Figure 4B:
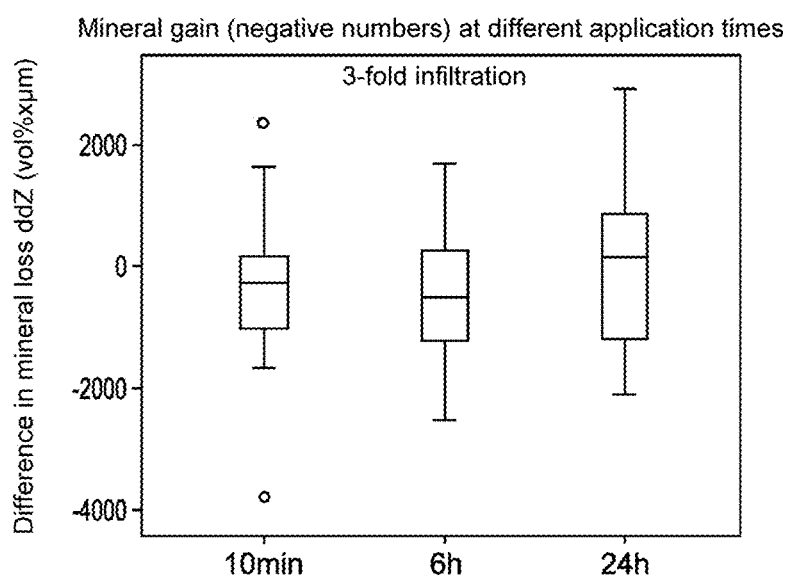
Figure 5:
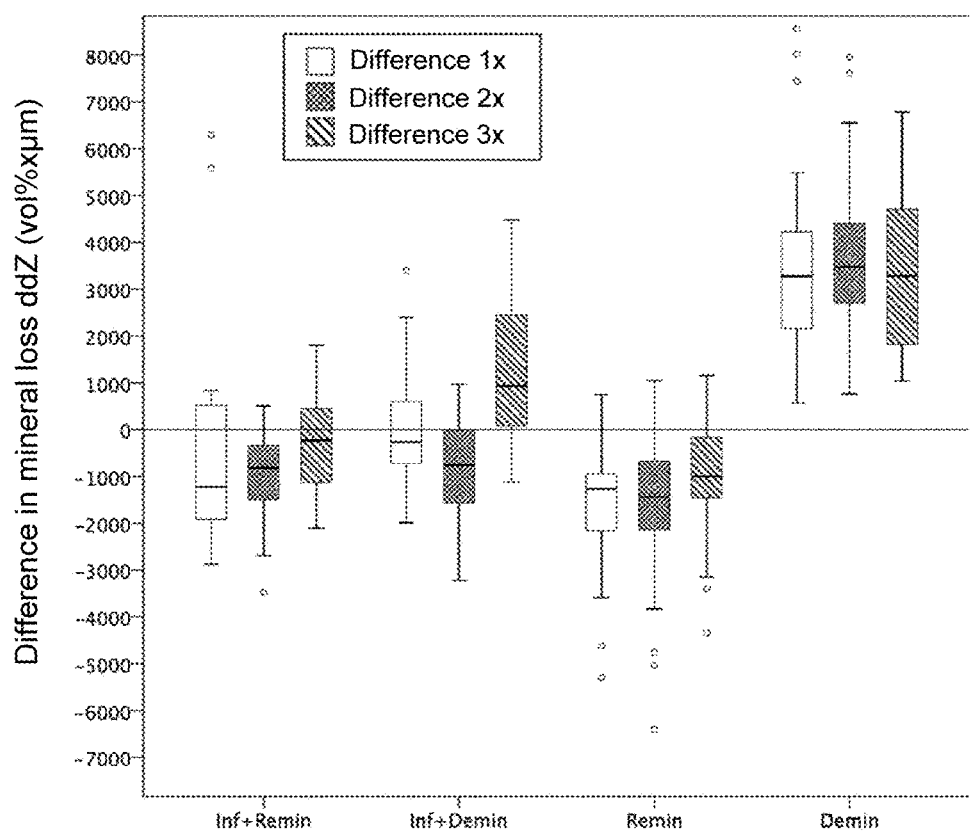
Figure 6:
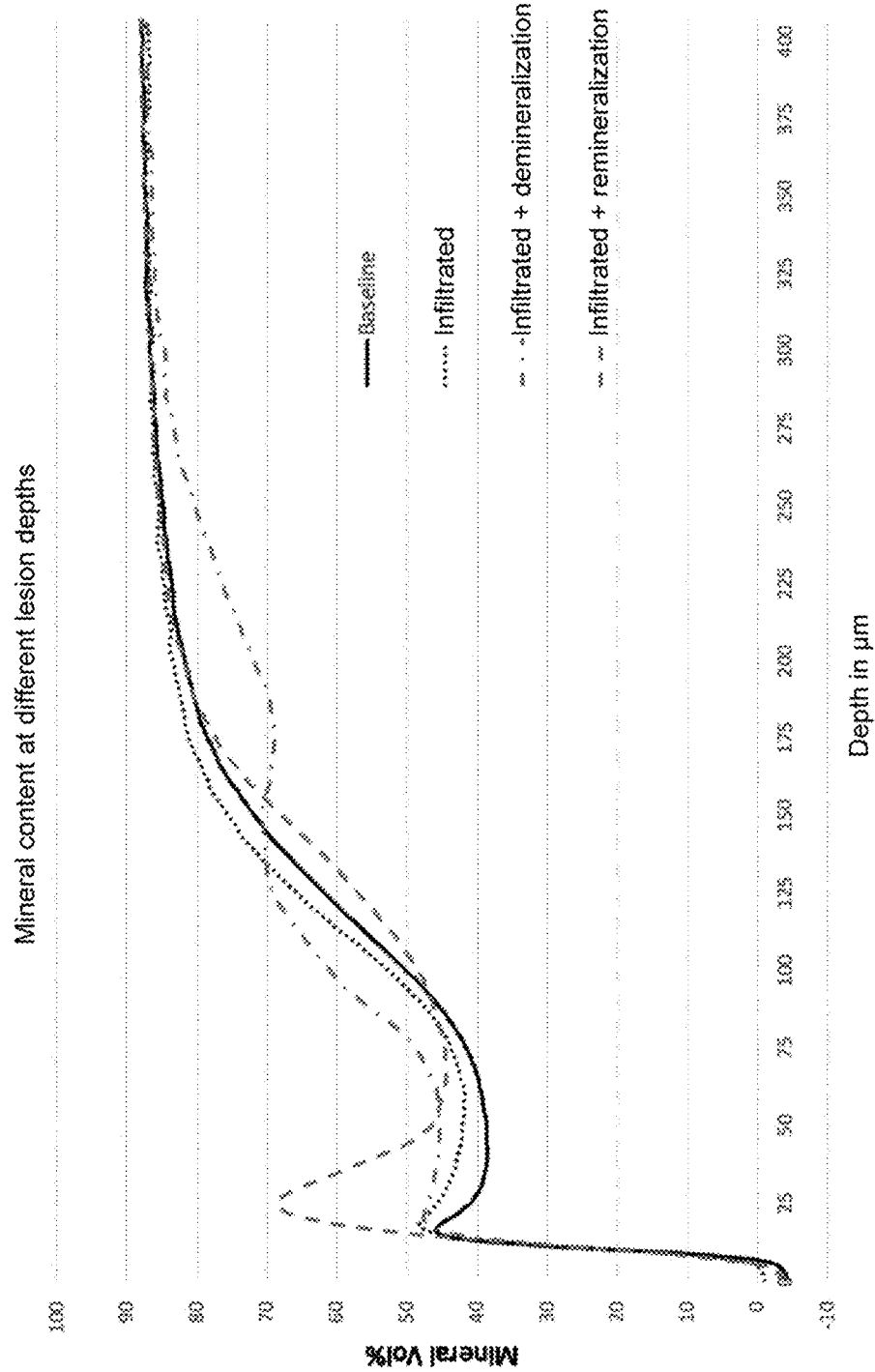
Figure 7A:
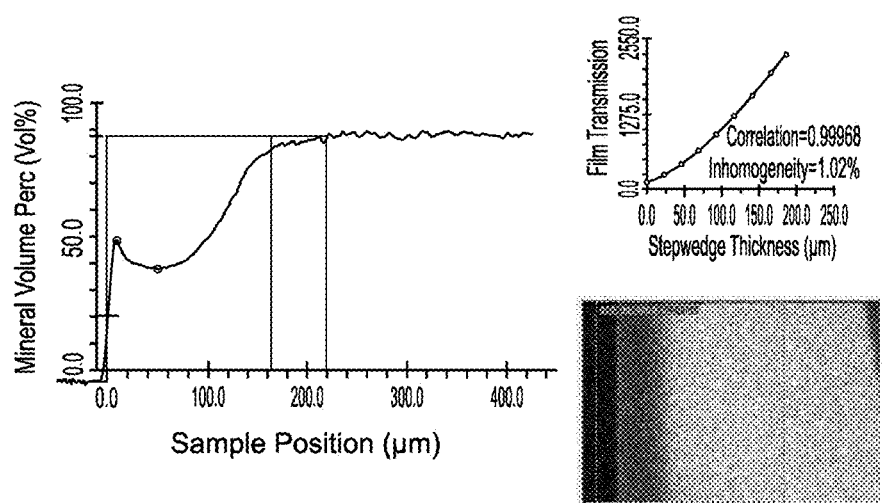
Figure 8:
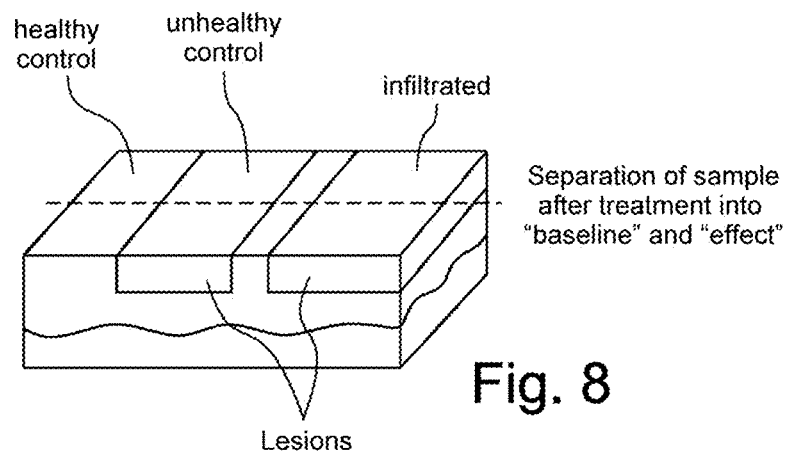
Figure 9:
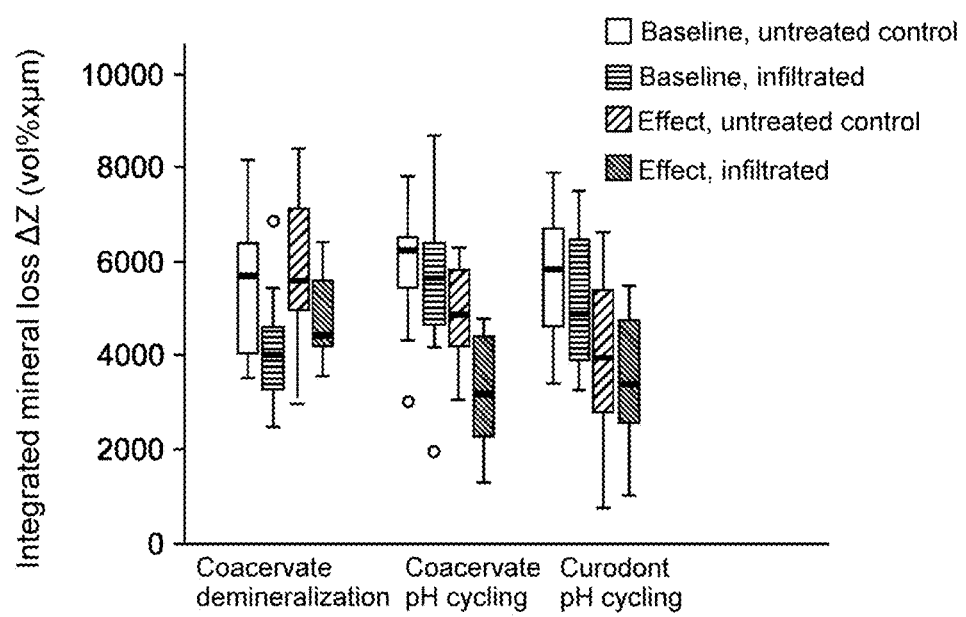
Figure 10:
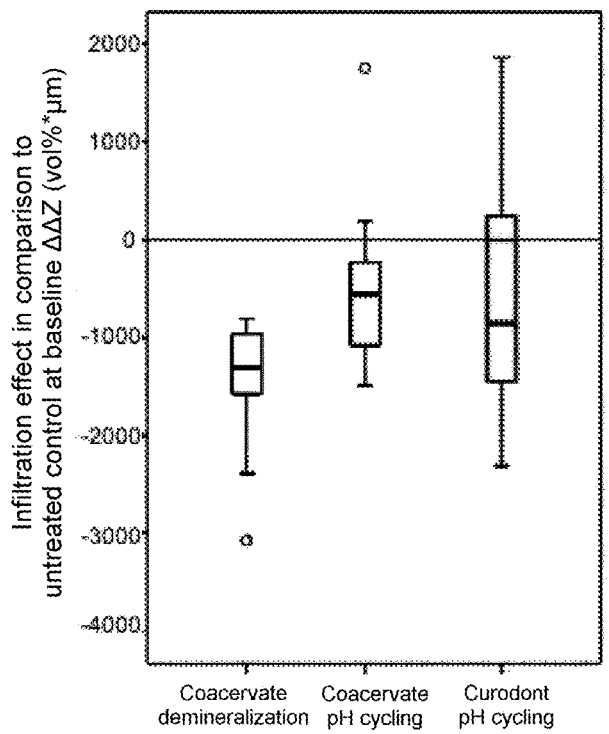
Figure 11:
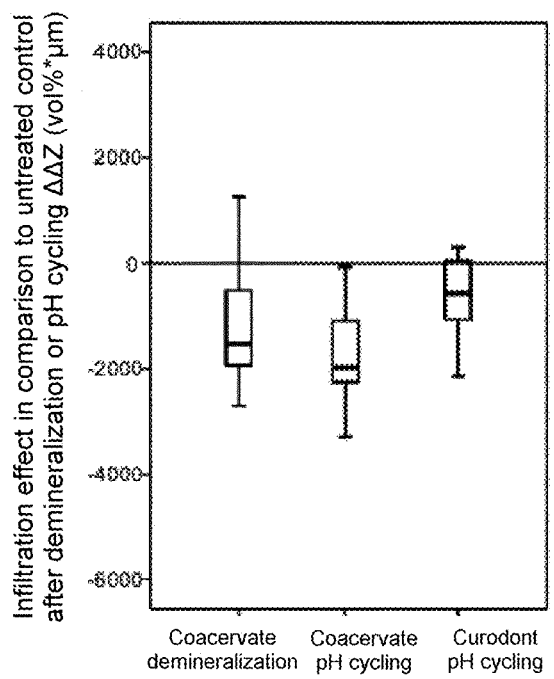
Figure 12:
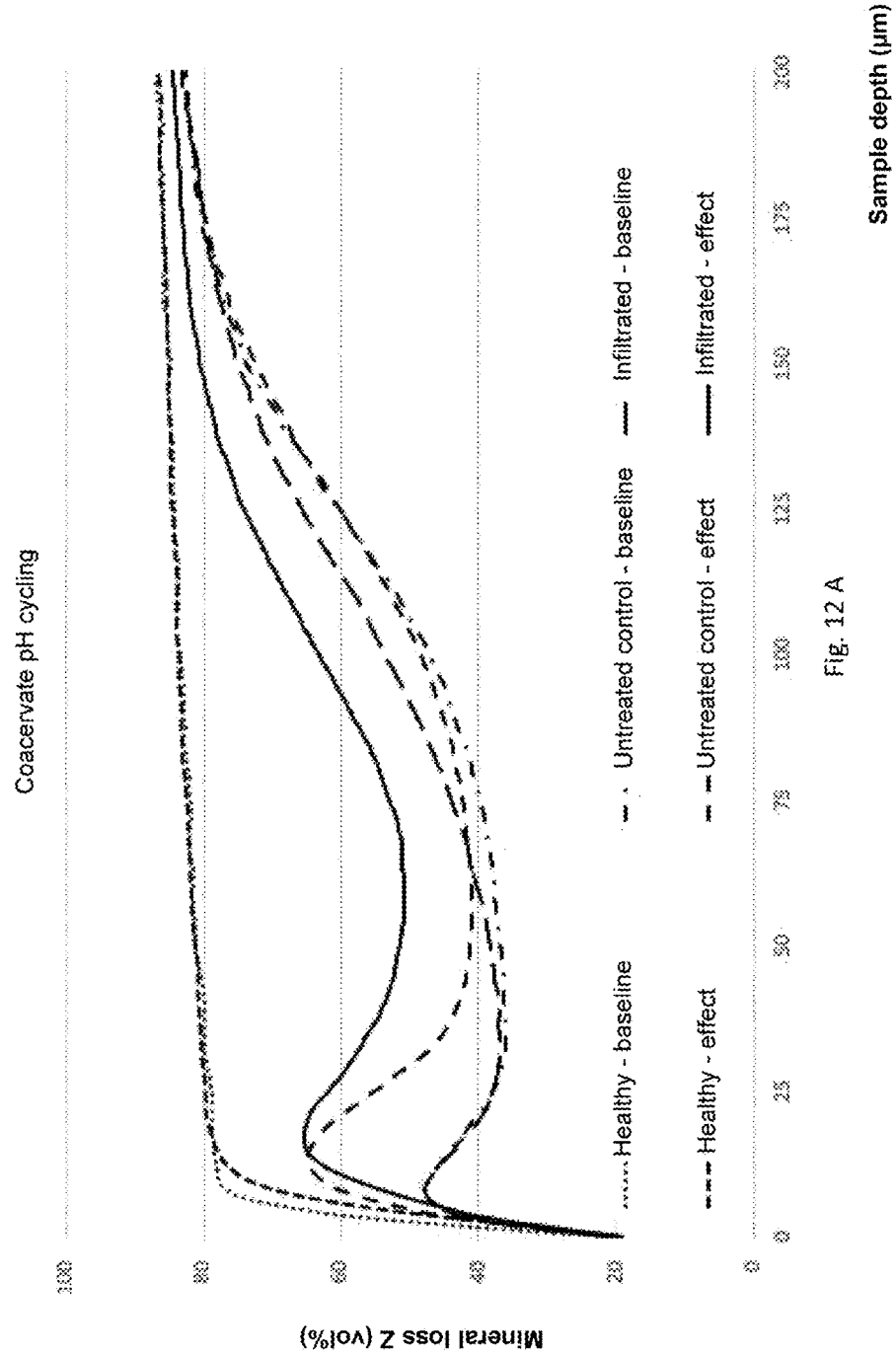
Figure 12:
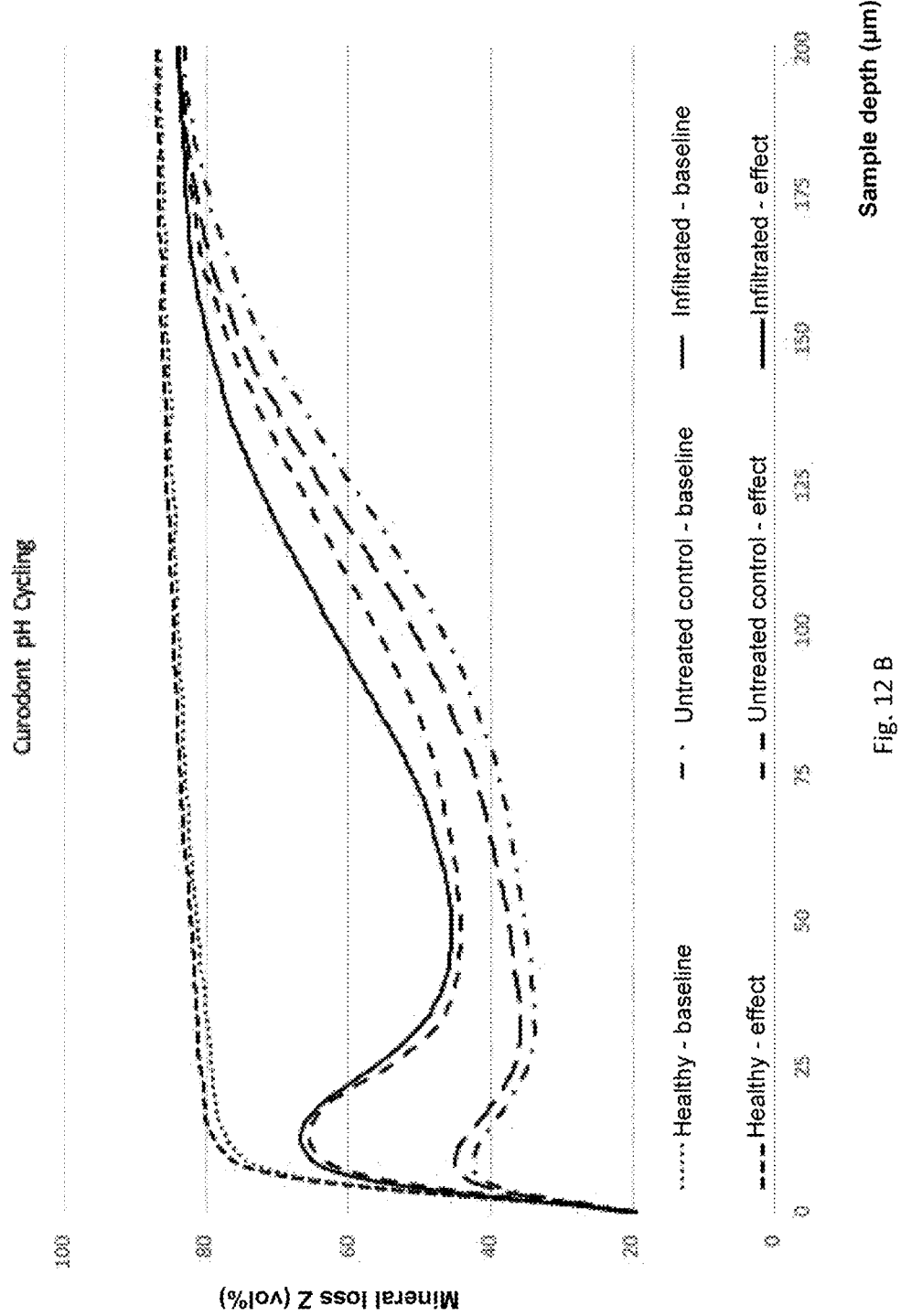

1× infiltrated" and "demineralized+2× infiltrated", conversely, the loss of mineral in the entire lesion body has decreased;

FIG. 2 shows the 2D transmission image of an enamel sample with three lesions A (demin. region), B (first effect area) and C (second effect area). The pale gray spots mark the measurement regions at the side edge and in the middle of the lesion. Measurements there were carried out in each case on the surface, in the lesion body and in the healthy enamel;

FIG. 3 Left: the diffraction pattern of an infiltrated lesion shows a pattern typical of hydroxylapatite (Li et al. 2009; H: hydroxylapatite; S: enamel; L: lesion; O: surface). Right: in an individual infiltrated sample, at a measurement point on the surface of the lesion, peaks were additionally demonstrated which are typical of octacalcium phosphate (Li et al. 2009; OP: octacalcium phosphate; S: enamel; L: lesion; O: surface);

FIG. 4 A: difference in mineral loss ddZ (vol %×µm) of the lesions after infiltration and exposure time for 10 min, 6 h and 24 h; B: difference in mineral loss ddZ (vol %×µm) of the lesions after triple infiltration and respective exposure time for 10 min, 6 h and 24 h;

FIG. 5 shows the difference in mineral loss ddZ (vol %×µm) between, before and after the de- and remineralization phase;

FIG. 6 shows the mean mineral profile of all of the 1× infiltrated samples tested (x-axis: lesion depth; y-axis: mineral content). Baseline: untreated lesions; infiltrated: lesions infiltrated with coacervate (from preceding experiment); infiltrated+demineralization: lesions exposed after infiltration to a demineralization solution; infiltrated remineralization: lesions exposed after infiltration to a remineralization solution;

FIG. 7 A: the mineral profile of an exemplary artificial carious lesion (screenshot); B: mineral profile (screenshot) of the same sample after single infiltration with coacervate and subsequent storage in a demineralization solution. Noteworthy is the zone of virtually complete remineralization at approximately 150 µm, while beneath it the demineralization has evidently proceeded further;

FIG. 8 shows a schematic representation of bovine enamel samples. After treatment with the various infiltration solutions, the samples were separated lengthwise (dashed line). While the direct infiltration effect was evaluated on one half (baseline), the second halves (effect) were exposed to a second demineralization or a pH cycle and evaluated thereafter;

FIG. 9 shows integrated loss of mineral (AZ in vol %×µm) of the individual sample areas and groups;

FIG. 10 shows the difference in the integrated mineral loss between infiltrated and untreated areas in the baseline halves (ΔZ in vol %×µm) of the individual groups;

FIG. 11 shows the difference in the integrated mineral loss between infiltrated and untreated areas in the effect halves (ΔZ in vol %×µm) after repeat exposure of the samples of group 1 to the demineralization solution and the exposure of the samples of groups 2 and 3 to pH cycling; and FIG. 12 shows mineral loss Z (vol %) of the various sample areas at different sample depths. A: group 2: coacervate, pH cycling, B: group 3: Curodont™ Repair, pH cycling

EXAMPLES

Further advantages, characteristics, and features of the present invention will become clear from the detailed description below of working examples with reference to the appended drawings. The invention, however, is not limited to these working examples.

The remineralization of artificial enamel caries by calcium coacervate solutions was evaluated by means of the experimental examples below.

Example 1: Evaluation of the Optimum Composition of the Coacervate Solution

The optimal mixing ratio of the components of the coacervate solution was determined as follows:
Pretreatment of the Enamel Samples For the infiltration experiments, bovine enamel samples with three demineralized regions each (A, B, C) were used, each representing an artificial carious lesion. For removal of the pseudointact surface layer, demineralized regions B and C were subjected to partial etching with 37% phosphoric acid gel for 5 seconds, while area A remained as an untreated control (demin.). The samples were subsequently rinsed off, dried, and placed for 60 minutes in a saturated dipotassium hydrogen phosphate solution (1 M).
Preparation of the Coacervates and Infiltration of the Samples The calcium coacervate solutions were prepared with continuous stirring on a magnetic stirrer. For these solutions, 500 µl of polyacrylic acid sodium salt (PAA-Na; pH=9, Mw=15 kDa) in different concentrations (Table 1) were measured off using an Eppendorf pipette and introduced into a reaction vessel. The magnetic stirrer was switched on and then one of the volumes of calcium chloride dihydrate ($CaCl_2 \cdot 2H_2O$; 50 mM, pH=6) defined in Table 1 was slowly added. The solution, depending on the amount of $CaCl_2 \cdot 2H_2O$, acquired a more or less milkily hazy appearance.

TABLE 1

| | Composition of the groups | | |
|---|---|---|---|
| Group | PAA-Na conc. (500 µl) | $CaCl_2 \cdot 2H_2O$ (50 mM) volume in µl | N |
| 1 | 2.5 mg/ml | 100 | 10 |
| 2 | | 170 | 9 |
| 3 | | 240 | 9 |
| 4 | 5 mg/ml | 200 | 9 |
| 5 | | 250 | 9 |
| 6 | | 300 | 10 |
| 7 | 10 mg/ml | 400 | 8 |
| 8 | | 450 | 9 |
| 9 | | 500 | 8 |

After the calcium coacervate solutions had been prepared they were immediately applied in excess to the lesion areas B and C (infiltration). The excess of the infiltration solution was left on the lesion areas and not wiped off. The samples were stored overnight in a humidity chamber at room temperature. The next day the area C was again infiltrated with newly prepared calcium coacervate solution. This area was exposed for 5 minutes prior to commencement of the production of the thin sections.
Analysis For the analysis of the mineral gain, 100 µm thin sections of the enamel samples were prepared and were subjected to Transverse Microradiography (TMR). The mineral loss (AZ) was determined on the individual effect areas with the aid of TMR software.

Results

Figure 1:
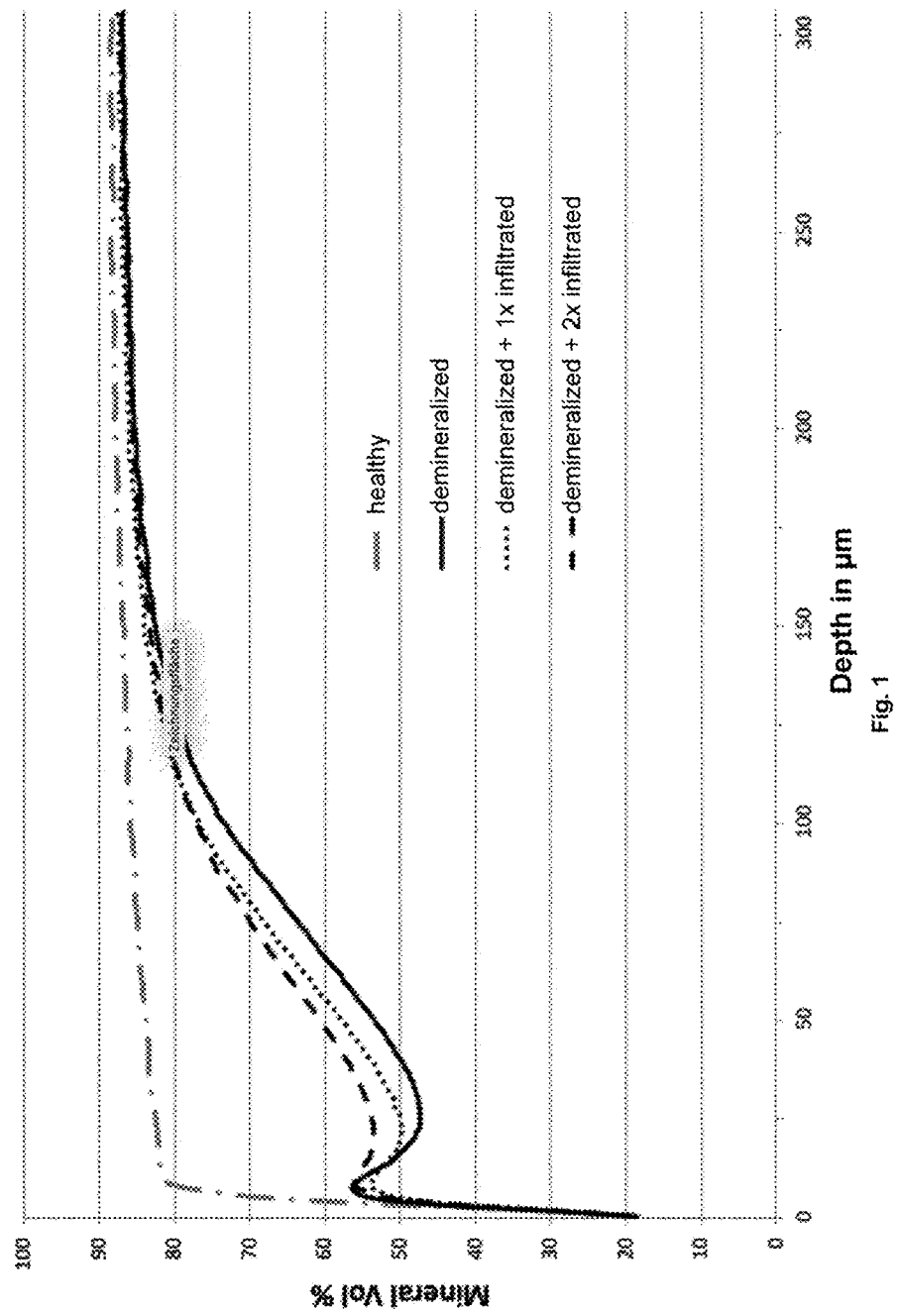
FIG. 1 shows the average mineral profile in group 8. Relative to the healthy control area (healthy), the demineralized untreated control (demineralized) reveals a loss of mineral (area between healthy and demineralized curves) and also a somewhat more highly mineralized surface layer in the outer 20 μm. In the infiltrated areas "demineralized+

Group 8, with the strongest and statistically significant mineral gain, is marked in Table 2 by underlining. In group 8, a significant mineral gain relative to the control, of 18% and 33%, respectively, was observed. The mineral profile curve (FIG. 1) shows a mineral gain relative to the untreated demineralized sample in the entire lesion body.

In a further step, the diffraction images were selected. These images were halved centrally, as they have symmetrical constructions.

Results

No fundamental differences were evident in the diffraction pattern in the different regions of the sample, which points to a homogeneous composition of the enamel.

TABLE 2

Results of microradiographic analysis: mineral loss ($\Delta Z$ in vol % x$\mu$m) and change in the mineral loss relative to the untreated control ($\Delta\Delta Z$ % in %)

| Group | $\Delta Z$ untreated median (Q25/Q75) | $\Delta Z$ 1x infiltrated median (Q25/Q75) | $\Delta Z$ 2x infiltrated median (Q25/Q75) | $\Delta\Delta Z$ Z % 1x infiltrated median (Q25/Q75) | $\Delta\Delta Z$ % 2x infiltrated median (Q25/Q75) |
|---|---|---|---|---|---|
| 1 | 3927 (2837/4443) | 3949 (3370/4897) | 3833 (2051/4442) | −5 (−22/7) | −2 (−9/28) |
| 2 | 4345 (3411/4816) | 4231 (3821/4730) | 3591 (3484/3711) | 7 (−9/15) | 8 (−9/21) |
| 3 | 2997 (2656/4544) | 3499 (2635/4406) | 3120 (2834/3731) | −4 (−22/26) | 6 (−5/18) |
| 4 | 4381 (4154/5163) | 4709 (4249/5293) | 3514 (2993/4303) | 5 (−23/9) | 15 (10/21) |
| 5 | 2623 (2221/4555) | 3439 (2442/3786) | 2693 (2493/3530) | 5 (−9/7) | 18 (−13/26) |
| 6 | 4530 (3368/5043) | 4094 (3287/4571) | 3602 (3141/4494) | 8 (−2/19) | 1 (−14/32) |
| 7 | 4434 (3464/5136) | 4355 (3747/5393) | 4188 (3184/4923) | −6 (−29/16) | 2 (−37/27) |
| <u>8</u> | <u>3548</u> (<u>3099/4828</u>) | <u>3079</u> (<u>2342/3953</u>) | <u>2360</u> (<u>2008/2983</u>) | <u>18</u> (<u>14/22</u>) | <u>33</u> (<u>28/36</u>) |
| 9 | 3918 (3030/5798) | 3725 (3255/5552) | 3869 (3095/4274) | −1 (−15/16) | 17 (−13/29) |

Example 2: X-Ray Diffraction Analysis

The mineral composition of the infiltrated samples was analyzed as follows:

Experimental Procedure

Two enamel samples previously infiltrated with the optimal calcium coacervate solution were analyzed by x-ray diffraction at the Berlin Helmholtz Center of Materials and Energy (Bessy). For this purpose, the samples were irradiated with an x-ray beam having an energy of 18 keV, a wavelength of 0.69 Å and an approximate sample-detector distance of 24.7 cm.

The images were evaluated with the aid of the "XRDUA" program (De Nolf & Rickers, 2005, HASYLAB Jahresbericht 2004, ed. J. Schneider, HASYLAB, Hamburg, Germany) with the objective of producing a graphical representation of the entire dataset for each sample, in order to permit an assessment of which crystal compounds were present in the lesions. In a second step, a macro was produced for the "ImageJ" program in order to allow comparison of the entire dataset for each sample, consisting of a transmission scan and a diffraction scan. For the transmission images, the measurement points were scanned at a distance of 60 μm in the respective sample. In each lesion body, accordingly, it was possible to ascertain the precise image numbers with the associated diffraction pattern for precisely that point in the sample. The analysis extended from the surface of the lesion area over the lesion body to reach the healthy enamel (FIG. 2). Three measurement regions with three measurement points in each case were ascertained in this way. The diffraction patterns were represented graphically and compared in order to be able to draw conclusions regarding changes in the apatite structure.

For the crystal structure analysis of the three lesion areas, diffractograms were produced which originated from integration of the diffraction patterns (diffraction images not shown; for illustrative diffractograms see FIG. 3). The typical profile of a diffractogram for hydroxylapatite is depicted for comparison (Li et al., 2009, *A novel jet-based nano-hydroxyapatite patterning technique for osteoblast guidance*, J Roy Soc). 2-Theta deviates on the X-axis from the values of the axes represented below, since in the present experiment an x-ray source with a wavelength of $\lambda$=0.69 Å was used, whereas Li et al. used a Cu—K$\alpha$ radiation source with a characteristic wavelength of $\lambda$=1.54 Å.

A diffractogram typical of hydroxylapatite was found at all measurement points (FIG. 3). Only the second sample exhibited a different diffractogram in the region of the surface of the sample, in the infiltrated lesion area sited in the middle. On the basis of its profile, this diffractogram indicated the presence of octacalcium phosphate. The demineralized control area and the externally sited infiltrated lesion area were shown by diffractograms which indicated the presence of hydroxylapatite and corresponded to the graphs for the first sample as represented in FIG. 3. For this reason, FIG. 3 shows only the graph which has a different profile from that shown by Li et al. (2009).

No substantial differences were demonstrated in terms of crystal compounds between the demineralized control area and the effect areas infiltrated with calcium coacervate solution.

Example 3: Analysis of the Consequences of Exposure Time and Repetition of the Infiltration The consequences of different application times and application frequencies were analyzed as follows:

Pretreatment of the Enamel Samples

For the infiltration experiments, again, bovine enamel samples with three demineralized regions (A, B, C) in each case were used. In contrast to example 1, however, the sample here was divided lengthwise, allowing the original mineral content to be determined by means of the control half for each of the three lesions (demin. control). In the effect half of the samples, the demineralized regions A, B and C were subjected to partial etching with 37% phosphoric acid gel for 5 seconds in each case. The samples were subsequently rinsed off and dried. The saturated dipotassium hydrogen phosphate solution (1 M) was applied for 3 min, and the excess was wiped off, and the samples were dried.

Preparation and Application of the Coacervates

The calcium coacervate solutions were prepared as described in example 1. Corresponding to the best group from experiment 1, 500 µl of PAA (10 mg/ml, pH=9.0) and 450 µl of $CaCl_2 \cdot 2H_2O$ (50 mM, pH=6.0) were mixed. After the preparation of the calcium coacervate solutions, they were applied immediately in excess to the lesion areas A, B and C already infiltrated with phosphate ion-containing solution (infiltration). After 3 min, excesses were wiped off and the samples were stored for 10 min (A), 6 h (B) and 24 h (C) at 100% atmospheric humidity at 20° C. In group 1 the samples subsequently underwent microradiographic analysis. In group 2 the samples were infiltrated as described above two further times with corresponding exposure times for the different lesions (A, B, C).

Analysis

For the analysis of the mineral gain, 100 µm thin sections of the enamel samples were produced and subjected to analysis by microradiography (TMR). The mineral loss (ΔZ) on the individual effect areas was determined with the aid of TMR software.

Results

In group 1, in which the samples had undergone only 1-fold infiltration, a mineral gain of about 15-20% was apparent, whereas in group 2, in spite of three-fold infiltration, there was no significant additional mineral gain observable (FIG. 4).

Example 4: Analysis of the Consequences of Storage with Calcium Coacervate-Infiltrated Lesions in De- and Remineralization Solutions Further, simulations were carried out of the behavior of infiltrated lesions when subjected additionally to a demineralizing (caries-promoting) or remineralizing medium. The gain or loss of mineral from artificial carious lesions, infiltrated in de- or remineralizing solutions with calcium coacervates, was analyzed for this purpose as follows:

Pretreatment of the Enamel Samples

Experimental Design:
    37 enamel samples each with 3 free enamel areas (1, 2, 3)
    demineralization solution (as described below) for 17 days to generate artificial carious lesions
    isolation of half of the samples in each case for determination of the initial mineral loss (baseline)
    Infiltration with coacervate solution as described above:
    Difference 1×: 1× infiltrated
    Difference 2×: 2× infiltrated
    Difference 3×: 3× infiltrated
        exposure time to dipotassium hydrogen phosphate and coacervate in each case 3 min.
        time between infiltrations: 10 min.

The samples subsequently underwent randomized division into two groups (n=18, n=19) and were stored for 10 days either in a demineralization solution or in a remineralization solution:

Further De- or Remineralization

Demineralization
    n=18
    duration: 20 days
    pH: 4.95 (measured daily; adjusted if needed with: HCl 10 M/KOH 10 M)
    38° C.

| Substance | Amount |
|---|---|
| 1. Aqua dest. | ad 5 l |
| 2. $CaCl_2 \cdot 2H_2O$ | 2.205 g |
| 3. $KH_2PO_4$ | 2.041 g |
| 4. MHDP | 5.3 mg |
| 5. $CH_3COOH$ | 14.30 ml |
| 6. KOH 10M | pH adjusted to 4.95 |

Remineralization

| Substance | Amount |
|---|---|
| 1. Aqua dest. | ad 5 l |
| 2. $CaCl_2 \cdot 2H_2O$ | 1.103 g |
| 3. $KH_2PO_4$ | 0.612 g |
| 4. KCl | 48.45 g |
| 5. Hepes buffer 1M | 100 ml |
| 6. $F^-$ (0.1M) | 263 µl |
| 7. HCl 10%/KOH 1M | Adjust pH to 7.00 | n=19
    duration: 10 days
    pH: 7.00 (measured daily; adjusted if needed with: HCl 10 M/KOH 10 M)
    38° C.

Results

FIG. 5 shows the difference in the mineral content between, before and after the de- and remineralization phases. As expected, untreated samples in the remineralization solution showed a mineral gain (negative values) and the untreated samples in the demineralization solution showed a mineral loss (positive values). In both solutions, previously infiltrated samples showed a trend toward a slight mineral gain (exception 3× infiltrated & demin, slight mineral loss). This shows that the infiltration protects against further mineral loss.

Figure 7B:
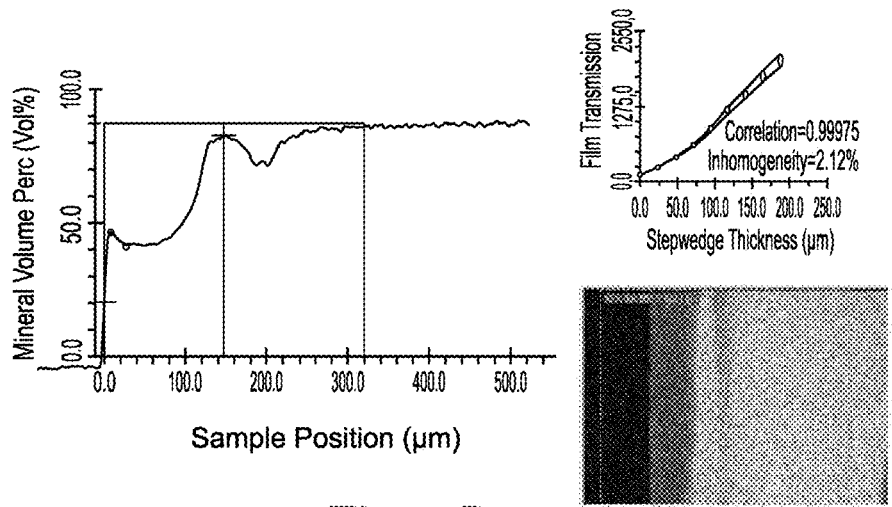

A striking feature is the formation of comparatively highly mineralized zones in the former lesion body in spite of the demineralizing medium (FIG. 6, dashed curve; FIG. 7b). Moreover, there was no significant further net mineral loss. This effect was found to be the most pronounced for samples infiltrated only once.

Conclusions

The experiments described above showed that the infiltration of artificial carious lesions with the coacervate solutions resulted in a mineral gain in the lesions. The mineral deposit appeared to consist predominantly of hydroxylapatite. A 10 min. exposure time to the coacervate solutions was sufficient. No additional mineral gain appears to be achievable through multiple application of the coacervate solutions. Surprisingly, in a demineralizing medium, the samples infiltrated previously showed a trend toward remineralization, but virtually no demineralization. The treatment proposed and tested herein is therefore—evidently and happily—caries-protective in its effect.

Example 5: Evaluation of the Remineralization of Bovine Enamel Samples by Coacervates A further investigation looked at the effect of the infiltration of artificial enamel caries with coacervates, especially in comparison with the Curodont™ Repair product, with subsequent simulation of a mouthlike environment.

Pretreatment of the Enamel Samples

For the experiment, enamel samples (n=95; 8×5×4 mm) were prepared from bovine incisors and were embedded in methacrylate polymer. Using nail varnish, two regions in each case were masked on the uncovered enamel surface in such a way as to form two exposed areas, while the masked areas remained as a "healthy control" (FIG. 8). The samples thus prepared were exposed for 22 days to a demineralization solution (pH=4.95, Tab. 3) in order to create artificial carious lesions in the regions not masked (FIG. 8). The samples pretreated in this way underwent randomized division into 3 groups (Tab. 4). While one of the two lesions per sample remained untreated subsequently ("untreated control"), the second lesion ("infiltrated") was subjected to partial etching with 37% phosphoric acid gel for 5 s in order to remove the pseudointact surface layer.

TABLE 3

Composition of the de- and remineralization solutions

| Demineralization solution pH = 4.95 (Buskes et al., 1985) | Remineralization solution pH = 7 (Buskes et al., 1985) |
|---|---|
| $CaCl_2 \cdot 2H_2O$ (3 mM) | $CaCl_2 \cdot 2H_2O$ (1.5 mM) |
| $KH_2PO_4$ (3 mM) | $KH_2PO_4$ (3 mM) |
| MHDP (6 μM) | KCl (130 mM) |
| | Hepes buffer (20 mM) |
| | $NaN_3$ (3 mM) |
| | $F^-$ (5.26 mM) |

Buskes, J. A., Christoffersen, J., & Arends, J. (1985). Lesion formation and lesion remineralization in enamel under constant composition conditions. A new technique with applications. *Caries Res*, 19(6), 490-496.

TABLE 4

Infiltration solutions of the various groups

| Group | Infiltrate | Constituents/ concentration | Name |
|---|---|---|---|
| 1 | Coacervate | $K_2HPO_4$ (1M) PAA-Na (10 mg/ml) $CaCl_2 \cdot 2 H_2O$ (50 mM) | Coacervate demineralization |
| 2 | Coacervate | $K_2HPO_4$ (1M) PAA-Na (10 mg/ml) $CaCl_2 \cdot 2 H_2O$ (50 mM) | Coacervate pH cycling |
| 3 | Curodont ™ Repair LOT: 180524 | see manufacturer information | Curodont ™ pH cycling |

Preparation of the Coacervates and Infiltration of the Samples

For the infiltration with coacervates, after the phosphoric acid etching, the samples from groups 1 and 2 dried above were infiltrated for 3 min with 1M $K_2HPO_4$ and the samples were subsequently air-dried.

To prepare the coacervate solution, 500 μl of PAA-Na were measured off and introduced into an Eppendorf vessel. With continual stirring on a magnetic stirrer, 450 μl of $CaCl_2 \cdot 2 H_2O$ were added, after which the solution became milkily hazy. After the preparation of the coacervate solution, it was applied immediately in excess to the lesion areas ("infiltrated", FIG. 8) for 10 min, after which the excess was removed.

Curodont™ Repair in group 3 was used in accordance with manufacturer information (batch number LOT: 180524).

After the infiltration, the samples were divided into two halves at right angles to the lesions (FIG. 8). While one half was analyzed directly as a baseline control ("baseline"), the second half ("effect") was exposed to further simulation of an oral environment.

Group 1 was exposed again for 20 days to a demineralization solution (Tab. 4). Groups 2 and 3 were subjected to pH cycling for 28 days. The cycle consisted of demineralization phases of 3 h (demineralization solution Tab. 3) and remineralization phases of 21 h (remineralization solution Tab. 3). The solutions were introduced into the respective containers without direct contact with the samples, meaning that the samples were covered with a generous excess. In the case of the alternating solutions of the pH cycle, the previous solution was always pumped off entirely.

Analysis

For analysis of the mineral gain, 100 μm thin sections of the enamel samples were produced and subjected to analysis by microradiography (TMR). The mineral loss (ΔZ) on the individual effect areas was determined with the aid of TMR software.

Results

In groups 1 to 3, infiltration resulted in a slight mineral gain (FIG. 9). In group 3 (Curodont™, pH cycling), however, this gain was not significantly different from that of the untreated control (FIG. 10).

Following renewed exposure of the group 1 samples to the demineralization solution, a higher mineral loss in comparison to baseline was ascertained in the untreated areas. In the infiltrated areas, a smaller mineral loss was demonstrated than in the areas not infiltrated.

After the exposure of the samples of groups 2 and 3 to the pH cycling, a lower mineral loss in comparison to baseline was ascertained in the untreated areas. The pH cycling therefore resulted in a slight mineral gain in the untreated areas. In the infiltrated areas of group 2, however, a significantly higher mineral gain was found by comparison with the untreated areas, whereas in group 3 there was no significant difference found between the infiltrated and untreated areas of the exposed sample halves.

Whereas the mineral gain in the effect halves of the untreated sample areas after pH cycling, in comparison to baseline, was found primarily in the surface (formation of a pseudointact surface layer), a mineral gain in the entire lesion body was found in the infiltrated effect areas of group 2 (FIG. 12A; solid black curve). This effect was not observed in the case of group 3 (FIG. 12B; solid black curve).

CONCLUSIONS

Infiltration of the artificial enamel samples with coacervate solution results in a mineral gain. Where the samples infiltrated with coacervate are exposed to a calcium- and phosphate-containing solution (in order to simulate a mouthlike environment), a mineral gain is observed in the entire lesion body.

Coacervates can therefore evidently and happily be used as a remineralization-promoting product in dental medicine.

Although the present invention has been described in detail with reference to the working examples, it is self-evident to the skilled person that the invention is not limited to these working examples, but that instead modifications are possible in such a way that individual features may be omitted or different kinds of combinations of the individual features presented can be realized, provided the scope of protection of the appended claims is not departed. The present disclosure includes all combinations of the individual features presented.

The invention claimed is:

1. A method for caries prevention and/or caries treatment, comprising a step of applying a composition comprising calcium coacervate to dental enamel, wherein the calcium coacervate is prepared by a method which comprises a step wherein a solution which comprises polyanions and/or their salts is mixed with a calcium ion-containing solution.

2. The method of claim 1, characterized in that the calcium coacervate is present in the composition as an emulsion.

3. The method of claim 1, characterized in that the method comprises steps of:
   (a) applying a composition comprising phosphate ions to the dental enamel; and
   (b) subsequently applying the composition comprising calcium coacervate to the dental enamel.

4. The method of claim 3, characterized in that the method comprises a step wherein
   (b1) between the applying in step (a) and the applying in step (b) the dental enamel is dried.

5. The method of claim 3, characterized in that the method comprises a step wherein
   (a1) prior to the applying in step (a) the pseudointact surface layer of the dental enamel is wholly or partly removed.

6. The method of claim 1, characterized in that the calcium coacervate is prepared by a method which comprises steps wherein polyacrylic acid-containing solution and calcium ion-containing solution are mixed in a molar ratio of 70.5:10 to 70.5:35 based on the concentration of polyacid and of calcium ions respectively.

7. The method of claim 6, wherein the polyacrylic acid-containing solution and calcium ion-containing solution are mixed in a molar ratio of about 70.5:22.5, based on the concentration of polyacid and of calcium ions respectively.

8. The method of claim 1, characterized in that the polyanions are polyacid anions.

9. The method of claim 8, wherein the polyanions are polyacrylic acid anions.

* * * * *